(12) United States Patent
Lerosey et al.

(10) Patent No.: US 11,405,117 B2
(45) Date of Patent: Aug. 2, 2022

(54) METHOD FOR DETERMINING A CHARACTERISTIC OF A RECEIVER IN A MEDIUM, AND SYSTEM IMPLEMENTING THIS METHOD

(71) Applicants: GREENERWAVE, Valdonne (FR); CENTRE NATIONAL DE LA RECHERCHE SCIENTIFIQUE - CNRS, Paris (FR); ECOLE SUPERIEURE DE PHYSIQUE ET DE CHIMIE INDUSTRIELLES DE LA VILLE DE PARIS, Paris (FR)

(72) Inventors: Geoffroy Lerosey, Paris (FR); Philipp Del Hougne, Paris (FR); Mathias Fink, Meudon (FR); Alexandre Aubry, Ivry sur Seine (FR)

(73) Assignees: GREENERWAVE, Valbonne (FR); CENTRE NATIONAL DE LE RECHERCHE SCIENTIFIQUE—CNRS, Paris (FR); ECOLE SUPERIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 99 days.

(21) Appl. No.: 17/052,995

(22) PCT Filed: May 24, 2019

(86) PCT No.: PCT/FR2019/051211
§ 371 (c)(1),
(2) Date: Nov. 4, 2020

(87) PCT Pub. No.: WO2019/224503
PCT Pub. Date: Nov. 28, 2019

(65) Prior Publication Data
US 2021/0167873 A1    Jun. 3, 2021

(30) Foreign Application Priority Data

May 25, 2018   (FR) ...................... 18 54469

(51) Int. Cl.
*H04B 17/27*   (2015.01)
*H04B 17/10*   (2015.01)
(Continued)

(52) U.S. Cl.
CPC .............. *H04B 17/27* (2015.01); *G01S 13/75* (2013.01); *H01Q 3/44* (2013.01); *H04B 17/102* (2015.01);
(Continued)

(58) Field of Classification Search
CPC .... H04B 17/103; H04B 17/27; H04B 17/102; G01S 13/75; H01Q 3/44
(Continued)

(56) References Cited

U.S. PATENT DOCUMENTS

2004/0263408 A1* 12/2004 Sievenpiper ......... H01Q 19/104
342/372
2017/0085126 A1*  3/2017 Leabman ................ H02J 7/025

FOREIGN PATENT DOCUMENTS

WO        2008/007024        1/2008
WO        2015/039769        3/2015
WO    WO-2015039769 A1 *   3/2015  ........... H01Q 1/2291

OTHER PUBLICATIONS

International Search Report for PCT/FR2019/051211 dated Nov. 12, 2019, 6 pages.
(Continued)

*Primary Examiner* — Christopher M Crutchfield
*Assistant Examiner* — Jean F Voltaire
(74) *Attorney, Agent, or Firm* — Nixon & Vanderhye

(57) ABSTRACT

Method for determining a characteristic of detection and/or identity information and/or location information of a
(Continued)

receiver, wherein: a) a primary wave is emitted by an antenna, b) adjustable elements are controlled with a plurality of sets of parameters, to modify the propagation of a primary wave and/or of a secondary wave coming from the receiver, and c) signals received by the antenna are saved, and d) the characteristic of the receiver in the medium is determined based on the signals received for each set of parameters.

27 Claims, 1 Drawing Sheet

(51) Int. Cl.
*G01S 13/75* (2006.01)
*H01Q 3/44* (2006.01)
*H04W 16/28* (2009.01)
*H04W 40/06* (2009.01)

(52) U.S. Cl.
CPC ........... *H04B 17/103* (2015.01); *H04W 16/28* (2013.01); *H04W 40/06* (2013.01)

(58) Field of Classification Search
USPC .......................................................... 370/329
See application file for complete search history.

(56) References Cited

OTHER PUBLICATIONS

Barros et al., "Integrated Terahertz Communication With Reflectors for 5G Small-Cell Networks", IEEE Transactions on Vehicular Technology, vol. 66, No. 7, Jul. 1, 2017, pp. 5647-5657.
Sawada et al., "Disconnection Probability Improvement by Using Artificial Multi Reflectors for Millimeter-Wave Indoor Wireless Communications", *IEEE Transactions on Antennas and Propagation*, vol. 61, No. 4, Apr. 1, 2013, pp. 1868-1875.
Brena et al., "Evolution of Indoor Positioning Technologies: A Survey", *Hindawi, Journal of Sensors*, vol. 2017, Article ID 2630413, Mar. 29, 2017, 22 pages.
Hougne et al., "Dynamic Metasurface Aperture as SmartAround-the-Corner Motion Detector", Scientific Reports, Apr. 25, 2018, 10 pages.

* cited by examiner

METHOD FOR DETERMINING A CHARACTERISTIC OF A RECEIVER IN A MEDIUM, AND SYSTEM IMPLEMENTING THIS METHOD

This application is the U.S. national phase of International Application No. PCT/FR2019/051211 filed May 24, 2019 which designated the U.S. and claims priority to FR Patent Application No. 18 54469 filed May 25, 2018, the entire contents of which are hereby incorporated by reference.

TECHNICAL FIELD

The present invention relates to a method and system for determining a characteristic of a receiver in a medium, said characteristic being detection information and/or identity information and/or location information of said receiver.

PRIOR ART

More particularly, the invention relates to a method for detecting, identifying, or locating a receiver by propagation of waves in the medium.

Many methods exist for these applications.

For example, according to a first technique for detecting/locating an object in a medium, an array of antennas is conventionally used which scans the area of the medium either by mechanical rotation of a directional beam antenna, or by tilting the beam by adjusting delays and amplitude weights on a plurality of antenna elements (beamforming technique). In addition, the location of the object is determined by the receiving antenna, by estimating the angle of arrival and the time of flight of a secondary wave reflected by the object after its illumination by the primary wave emitted.

However, this type of radar technique is not very effective in a complex medium comprising reverberations, and in particular inside a building, because of the multiple paths between the radar antenna and the object to be detected, located, and/or identified in the medium.

For example, according to a second technique for detecting/locating an object in a medium, a database of signatures of the presence of the object in a large number of places in the medium is used, and a primary wave is emitted which is reflected by the object as a secondary wave, and a saved received signal of the secondary wave is compared to all the signatures in the database to determine the one most resembling it in order to detect, locate, and/or identify the object in the medium.

However, this type of technique remains complex because it often requires storing a temporally long signal that comprises a large number of frequencies to ensure a reliable comparison. Despite this resource-intensive learning, this technique is sensitive to variations in the medium and to the imprecision of previously saved signatures.

DESCRIPTION OF THE INVENTION

The aim of the present invention is to provide a method for detecting and/or locating and/or identifying a receiver in a medium by wave propagation, which is more efficient and more reliable.

To this end, the method is implemented by a system comprising:
  an antenna capable of emitting a primary wave in the medium, and of receiving a secondary wave resulting from the primary wave and from the presence of the receiver in the medium,
  a plurality of adjustable elements having an impedance which can be modified to change the manner in which the primary wave is emitted and/or reflected and/or transmitted, and
  a controller connected to the antenna and to the adjustable elements and which controls the state of the adjustable elements based on a set of parameters.

In addition, the receiver is capable of actively emitting the secondary wave in response to receiving the primary wave.

The method is characterized in that the system:
  a) causes the antenna to emit a primary wave,
  b) controls the adjustable elements during at least one probing period, successively with a plurality of sets of parameters, each set of parameters being different from the previous one, in order to modify the propagation of the primary wave and/or secondary wave during the emission and/or reception of waves by the antenna,
  c) stores signals received by the antenna during said probing period, and
  d) determines the characteristic of the receiver in the medium based on the signals received for each set of parameters.

Due to the plurality of adjustable elements and their successive controlling with a plurality of sets of parameters, the method allows obtaining a same plurality of signals received from the receiver, these signals comprising a great wealth of information for detecting, locating, and/or identifying the receiver in the medium.

This method is simpler than antenna array techniques and more accurate than signature detection techniques, because the plurality of experiments with different parameters allows multiple different observations of the receiver in the medium.

In various embodiments of the method according to the invention, one or more of the following arrangements may possibly be used.

According to one aspect, the controller calculates an average of the received signals or an average of values calculated from the received signals, in order to determine the characteristic of the receiver.

According to one aspect, the plurality of sets of parameters is a random sequence.

According to one aspect, the plurality of sets of parameters is a previously saved sequence.

According to one aspect, the plurality of sets of parameters is a sequence which changes a small number of the adjustable elements at a time, said small number being less than 10% of the adjustable elements of the system, and the controller determines the characteristic based on the saved signals of the higher amplitude, and on knowledge of the positions of the adjustable elements which caused this higher amplitude.

According to one aspect, the controlling of the adjustable elements is carried out at a rate greater than a threshold rate, for example 10 per second.

According to one aspect, the controller compares the signals received for the plurality of sets of parameters with a stored database of predetermined signals, said database including the characteristic of the receiver in association with the predetermined signals.

According to one aspect, the predetermined signals comprise a single frequency.

According to one aspect, the system further comprises reference receivers of a predetermined characteristic, and the controller compares the signals received for the plurality of sets of parameters with a stored database of predetermined signals for those reference receivers, said database including the predetermined characteristic of each reference receiver in association with the predetermined signal for that reference receiver, and the characteristic of the receiver is determined by determining the comparison of highest likelihood between the signals received and the predetermined signals of the reference receivers.

According to one aspect, the predetermined signals of the reference receivers are periodically updated.

According to one aspect, the controller comprises control logic for the antenna and/or adjustable elements so that the primary wave is focused around one or more reference receivers, and the primary wave is focused around said reference receiver before performing steps a) to d).

According to one aspect, the signals received from the reference receivers are periodically measured with the plurality of sets of parameters, and only the most coherent received signals are kept in the database.

According to one aspect, the controller uses at least one data item included by the receiver in each of the received signals, said data item corresponding to the level and/or to the quality and/or to the estimate of the propagation channel transfer function between the antenna and the receiver.

According to one aspect:
the plurality of sets of parameters for the adjustable elements comprises a first set of parameters and a second set of parameters, the second set of parameters corresponding to a phase shift of $\pi$ radians relative to the first set of parameters,
the controller decodes, in the received signals, a first data item corresponding to the first set of parameters and a second data item corresponding to the second set of parameters, the first and second data items corresponding to the level of the wave received by the receiver, and
the characteristic of the receiver is determined from a first calculated value $\psi_1$ which is the difference between the second data item and the first data item, in other words:

$$\psi_1 = (I_2 - I_1)$$

where
$\psi_1$ is the first calculated value, and
$I_1$ and $I_2$ are respectively the first data item and the second data item.

According to one aspect:
the plurality of sets of parameters for the adjustable elements comprises a first set of parameters, a second set of parameters, a third set of parameters, and a fourth set of parameters, the second set of parameters corresponding to a phase shift of $\pi/2$ radians relative to the first set of parameters, the third set of parameters corresponding to a phase shift of $\pi$ radians relative to the first set of parameters, and the fourth set of parameters corresponding to a phase shift of $3 \cdot \pi/2$ radians relative to the first set of parameters,
the controller decodes, in the received signals, a first data item corresponding to the first set of parameters, a second data item corresponding to the second set of parameters, a third data item corresponding to the third set of parameters, and a fourth data item corresponding to the fourth set of parameters, the first, second, third, and fourth data items corresponding to the level of the wave received by the receiver, and
the characteristic of the receiver is determined from a second calculated value $\psi_2$ as follows:

$$\psi_2 = (I_3 - I_1) + i(I_4 - I_2)$$

where
$\psi_2$ is the second calculated value, and
$I_1$, $I_2$, $I_3$ and $I_4$ are respectively the first data item, the second data item, the third data item, and the fourth data item, and
i is the imaginary unit.

According to one aspect:
the controller decodes, in the received signals, a data item corresponding to the estimate of the propagation channel transfer function between the antenna and the receiver, and
the characteristic of the receiver is determined from a third calculated value $m(\omega)$ as follows:

$$m(\omega) = \frac{dA}{d\omega} A^*(\omega)$$

where
$m(\omega)$ is the third calculated value,
$A(\omega)$ is the transfer function as a function of the angular frequency $\omega$,
$d(\ )/d\omega$ is the derivative operator with respect to the angular frequency, and
$(\ )^*$ is the complex conjugate operator.

According to one aspect, the characteristic of the receiver is determined from an average or a dot product or a combination or a function of several calculated amounts, said calculated amounts being first calculated amounts or second calculated amounts or third calculated amounts.

Another object of the invention is to provide a system for determining a characteristic of a receiver in a medium. The characteristic is detection information and/or identification information and/or location information of this receiver in the medium.

To this end, the system comprises:
an antenna capable of emitting a primary wave in the medium, and of receiving a secondary wave resulting from the primary wave and from the presence of the receiver in the medium,
a plurality of adjustable elements having an impedance which can be modified to change the manner in which the primary wave is emitted and/or reflected and/or transmitted, and
a controller connected to the antenna and to the adjustable elements and which controls the state of the adjustable elements based on a set of parameters.

In addition, the receiver is capable of actively emitting the secondary wave in response to receiving the primary wave.

The system is characterized in that the system (1):
a) causes the antenna to emit a primary wave,
b) controls the adjustable elements during at least one probing period, successively with a plurality of sets of parameters, each set of parameters being different from the previous one, in order to modify the propagation of the primary wave and/or secondary wave during the emission and/or reception of waves by the antenna,
c) stores signals received by the antenna during said probing period, and
d) determines the characteristic of the receiver in the medium based on the signals received for each set of parameters.

In various embodiments of the system according to the invention, one or more of the following arrangements may possibly be used.

According to one aspect, the adjustable elements are part of a surface or a plurality of surfaces.

According to one aspect, the receiver responds to the primary wave by emitting a secondary wave including a data item stored in the receiver, and the controller processes the received signals to decode said data item and determine this characteristic.

According to one aspect, the receiver is an object connected to a wireless computer network, and the primary wave and secondary wave are emissions and/or receptions of the wireless network.

According to one aspect, the computer network is a Bluetooth, WiFi, or GSM type network.

According to one aspect, the receiver is an RFID type badge, and the secondary wave comprises at least one data item identifying said receiver.

According to one aspect, the adjustable elements are elements independent of the antenna and which change the manner in which the primary wave is reflected and/or transmitted.

According to one aspect, the adjustable elements are diffusers near the antenna and which change the manner in which the primary wave is emitted and/or received by said antenna.

According to one aspect, the adjustable elements are antenna elements of the antenna and are controlled with an adjustable phase.

According to one aspect, the adjustable elements are on a mobile device in the medium.

BRIEF DESCRIPTION OF DRAWINGS

Other features and advantages of the invention will become apparent from the following description of at least one of its embodiments, given as a non-limiting example, with reference to the accompanying drawings.

In the drawings.

In the various figures, the same reference numbers designate identical or similar elements.

DETAILED DESCRIPTION OF EMBODIMENTS

The invention relates to a method for detecting and/or locating and/or identifying a receiver in a medium, in particular by emission/reception of a wave in this medium. This wave is called the primary wave and may be electromagnetic, acoustic, or vibrational in nature.

For simplicity, the invention will be described primarily in the context of the application of an electromagnetic wave, in particular of the wireless transmission type, for example:

transmission of electromagnetic energy, or
GSM, 3G, 4G, 5G mobile telephony, or
WiFi, Bluetooth type wireless network, or
network between connected objects, for example iOT, or
RFID type badge readers, or
any other wireless transmission between devices having a wireless connection by radio wave.

However, the invention applies to any wave frequency domain.

Figure 1:
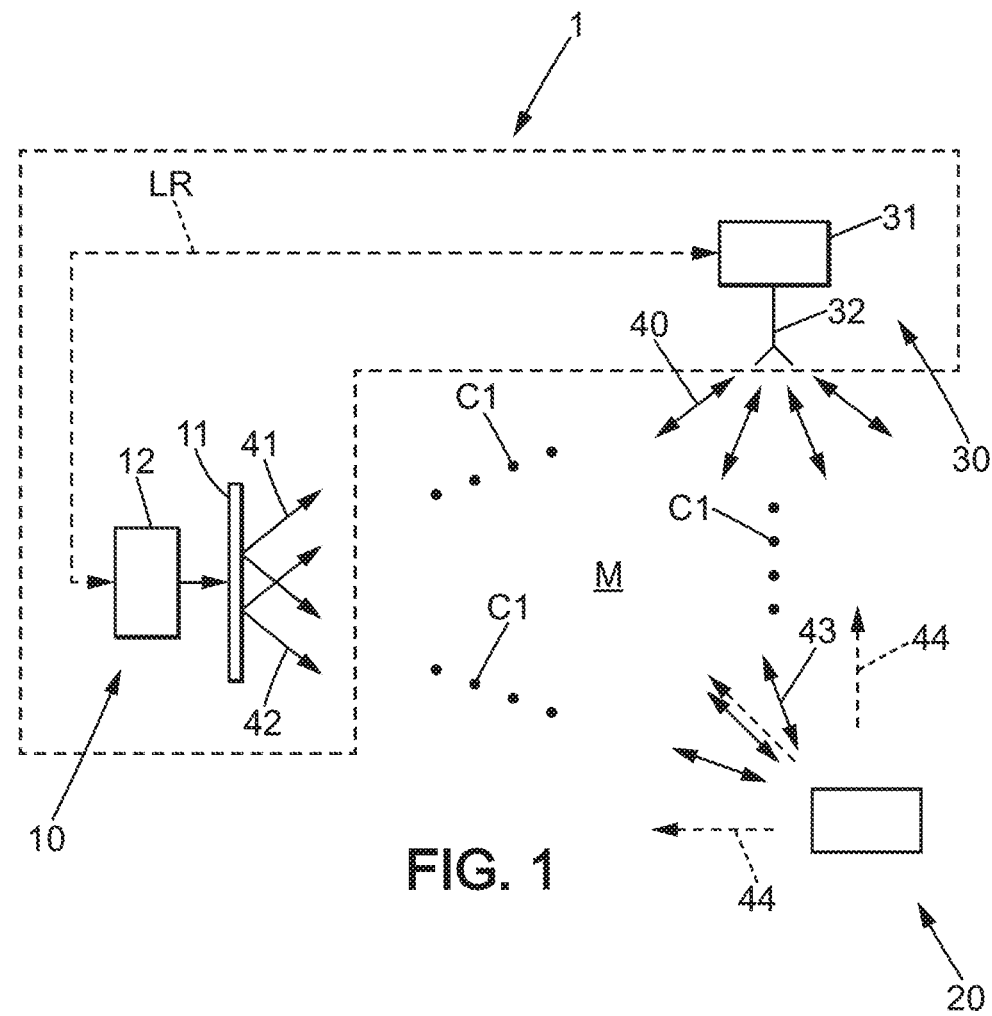
FIG. 1 shows a first embodiment of a system suitable for implementing a method according to the invention.

The method is implemented for example by a system 1 as schematically represented in FIG. 1.

The medium M comprises a receiver 20, this receiver 20 being for example an object or a device having an influence on the field of the waves in the medium M.

This receiver is of the active type, meaning it itself is able to emit a wave in the medium. In fact:

either the receiver itself is capable of emitting an electromagnetic wave in the medium M,
or the receiver is able to modify an incident electromagnetic wave reaching it; for example it is capable of converting this incident wave into another emitted wave (for example by modifying its frequency).

This active receiver 20 therefore responds to an electromagnetic wave in relation to an internal operation: internal processing or internal modification. This receiver therefore comprises internal logic which gives it active device status.

This receiver 20 is therefore not passive, the latter corresponding to most objects (passive) which have an electromagnetic response not actively modified by said object. Such a response is only a function of the material and shape of the object, and is not a function of any internal logic or operation of the object.

In addition, this receiver 20 may or may not be powered by an energy source. Optionally, the receiver 20 extracts the energy to power itself from a received wave, and optionally from the primary wave used by the system to detect and/or identify and/or locate it.

The system 1 comprises:

a first device, called a transmitter 30, capable at least of emitting a primary wave 40 in a wave propagation medium M, and possibly reciprocally of receiving a primary wave in this medium M, and
a second device, called a waveform shaping device 10, capable of modifying, at the receiver 20, the reception of the primary wave 40 emitted by the transmitter 30 and received as a transmitted primary wave 43.

These two devices, the transmitter 30 and the waveform shaping device 10, are connected by a link LR. The link LR is for example a digital link, and for example a wired link (for example Ethernet) or a computer or telephone type wireless link, according to one of the protocols already mentioned.

Figure 2:
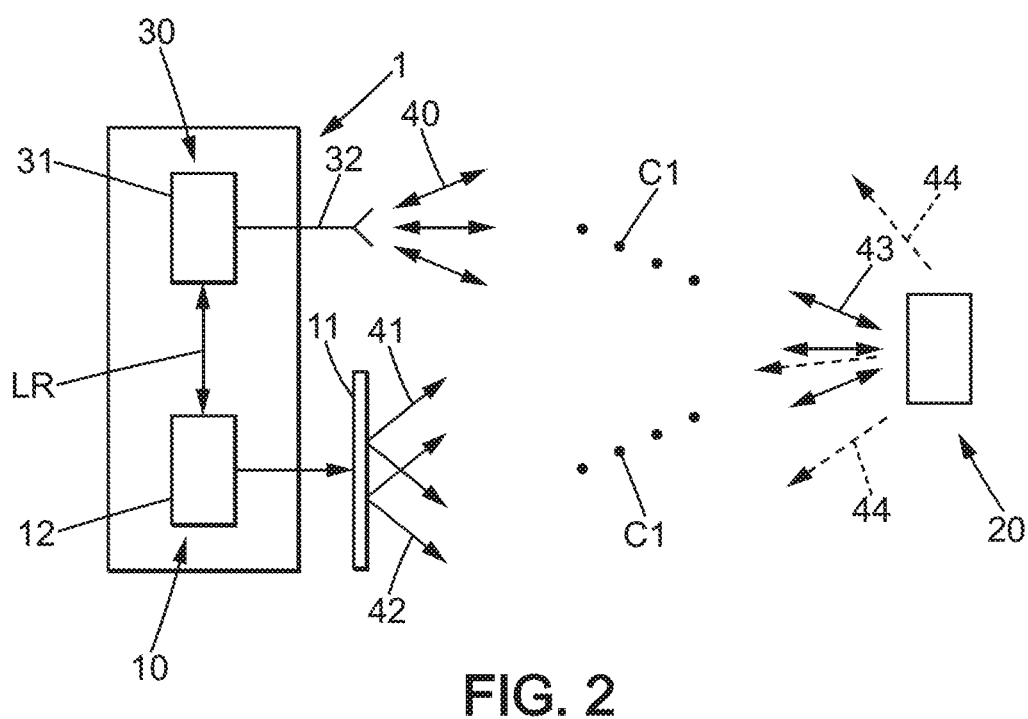
FIG. 2 shows a second embodiment of a system suitable for implementing a method according to the invention.

The transmitter 30 and the waveform shaping device 10 may be integrated into the same housing or separate housings, as shown in FIG. 2. Advantageously, they will be in separate housings in order to position the transmitter 30 in a location suitable for the application and to position the waveform shaping device 10 in a location suitable for the volume of the medium M and its environment.

Alternatively, the system 1 may comprise several identical or different waveform shaping devices 10, each connected by a link to the transmitter 30, which makes it possible to improve the influence of said waveform shaping devices on the transmitted primary wave 43 which is received by the receiver 20.

The transmitter 30 is a wireless transmission device, which comprises:

an antenna 32 which emits the primary wave 40 which propagates in the medium M, said antenna 32 possibly reciprocally also receiving a wave, and
a communication unit 31 which controls said antenna 32 and which is connected by the link LR to the waveform shaping device 10.

The antenna 32 may optionally be composed of several independent antenna elements each enabling the emission and/or reception of an independent signal, which allows increasing the number of channels and improving the determination of a detection and/or identification and/or location characteristic, by various techniques such as multi-beam focusing for example of the phased array antenna type, or any other technique.

Of course, different system architectures with a transmitter 30 and a waveform shaping device 10 are possible and accessible to those skilled in the art, in particular in terms of distribution and/or integration of functions of the system.

The receiver 20 receives the primary wave coming from the antenna 32 of the transmitter 30 directly and/or indirectly by reflection on elements of the medium (the environment), in the form of a transmitted primary wave 43 which is a combination of the contributions of all these direct or indirect paths.

The waveform shaping device 10 comprises:
  a tunable (electromagnetic) surface 11 which reflects an incident primary radio wave 41 as a reflected wave 42, said waves propagating in the same medium, and
  a controller 12 connected to the tunable (electromagnetic) surface 11 in order to control said tunable surface 11, in particular to vary an (electromagnetic) impedance thereof, which changes the manner in which the incident wave 41 is reflected as a reflected wave 42.

The purpose of the waveform shaping device 10 is thus to change the reception of the primary wave by the receiver 20 within a region including this receiver 20 and the waveform shaping device 10. This waveform shaping device 10 is for example useful in an environment having numerous and/or complex reflections for the waves, said reflections interfering with reception by the receiver 20. The waveform shaping device 10 generates another reflection which is controlled to change the reception by the receiver 20.

Reciprocally, the presence and action of a receiver 20 in the medium, within range of the waveform shaping device 10, influences this waveform shaping device 10.

The waveform shaping device 10 is thus within range of the receiver 20 and within range of the transmitter 30, i.e. at a distance enabling reception of a non-zero incident wave 41, and at a distance from the receiver 20 enabling reception of a non-zero transmitted wave contribution 43. This depends on the distances, but also on the propagation medium as explained above (multiple reflections).

The waveform shaping device 10 reflects the incident wave 41 emitted by the transmitter 30 or reflected 30 by another waveform shaping device, as a reflected wave 42. In a very simplified manner, the reflected wave 42 then also propagates in the medium, for example towards the receiver 20 where it contributes to the primary transmitted radio wave 43 received by said receiver 20.

In addition, the waveform shaping device 10 may or may not be powered by an energy source. Optionally, the waveform shaping device 10 extracts the energy to power itself from a received wave, and optionally from the primary wave emitted by the antenna 32 of the transmitter 30 and used by the system to detect and/or identify and/or locate the active receiver 20.

The tunable (electromagnetic) surface 11 may be constructed in a number of ways.

U.S. Pat. No. 6,538,621 shows an example of an electromagnetic surface in which the impedance is tunable or modifiable. This electromagnetic surface 11 comprises a plurality of resonator elements, each resonator element being adjustable. The electromagnetic surface 11 of this document comprises plate elements located at a distance from a ground plane, the neighboring plate elements being connected to each other by a variable capacitor, each variable capacitor able to be steered by a control voltage. The impedance of the electromagnetic surface is thus modified, for example to focus the reflected wave 42 or to give a spatial direction to the reflected wave 42. Optionally, the electromagnetic surface 11 consists of a plurality of cells, each cell comprising two different resonator elements.

Patent No. WO 2015/039769 cites and shows other types of resonator elements that can be used in an electromagnetic surface with tunable impedance:
  a variable diode can replace the variable capacitor,
  the resonator elements may have a single polarization type or two polarization types, optionally distributed in an alternating manner on the surface,
  the resonator elements have one or more resonant frequencies to control a predetermined frequency band,
  the resonator elements are binary elements with two states, for example defined by a change in phase or amplitude of the modified wave.

Many variations of known resonator elements may be used to form an electromagnetic surface 11 with tunable impedance.

The state of the resonator elements of the tunable surface 11 is thus defined by a set of parameters defined by the controller 12 of the waveform shaping device 10.

The controller 12 of the waveform shaping device 10, for example, controls all the adjustable elements (for example, variable diode or capacitance) of the electromagnetic surface 11, which makes it possible to change its impedance. This change is much more complex than spatial directivity or focusing. It changes the spatial distribution of the radio wave of the first propagation channel C1 in an area around the waveform shaping device 10 up to the receiver 20.

In patent WO 2015/039769, the waveform shaping device 10 comprises a transmission device for connecting to the receiver 20 (mobile electronic device), and for retrieving information contained in a pilot wave coming from this transmission device of this receiver 20, this information possibly being the level or the quality of the communication between the transmitter (the network station or access point) and the receiver (mobile electronic device). This makes it independent of the source of the primary wave.

In contrast, in the present patent application the waveform shaping device 10 is connected to the communication unit 31 by the link LR and is controlled by that unit. The shaping device 10 therefore depends on the communication unit 31 and is part of the system 1.

Finally, the system 1 or the waveform shaping device 10 or only the tunable surface 11 may be directly integrated into a building construction element: a cinder block, a brick, insulation, an insulating board, sheetrock, or some other element.

The system 1 or the waveform shaping device 10 or only the tunable surface 11 may also be directly integrated into building covering elements: parquet flooring, carpet flooring, tile flooring, a decorative panel, a wall lining, a ceiling, a false ceiling panel, or some other element.

The system 1 or the waveform shaping device 10 or only the tunable surface 11 may also be directly integrated into furniture elements: a desk, a cupboard, a shelving unit, a shelf, a mirror, a decorative picture, a light, a container such as a cash register drawer.

The system 1 or the waveform shaping device 10 or only the tunable surface 11 may also be directly integrated into transportation elements, mobile within a building or outdoors: car, truck, plane, trailer, trolley, cart for transporting goods.

This element comprises at least the tunable surface 11 of the reflecting device, or the entire waveform shaping device 10. It may be powered externally, or comprise a battery, or be powered remotely by induction, possibly on a continual basis.

In the present patent application, the receiver 20 receives a modified transmitted radio wave 43 (originating from a reflected wave 42); the mere presence of this receiver in the medium M generates a secondary wave 44 which is a reflection and/or transmission of the transmitted radio wave 43. This secondary wave 44 has physical characteristics which are functions of the reception of the transmitted radio wave 43 received by the receiver 20, in other words of radio reception between the antenna 32 and receiver 20.

Said physical characteristics are a kind of signature of this reception by the receiver 20.

The secondary wave 44 produced by reception of the primary wave at the receiver 20 is propagated back to the antenna 32 of the transmitter 30, and the transmitter measures a resulting wave.

The system 1 described above comprises a waveform shaping device 10 comprising adjustable elements capable of changing the manner in which a primary wave is reflected and/or transmitted by the set of said adjustable elements. This changes the (electromagnetic) impedance of this set of adjustable elements.

Thus, the waveform shaping device 10 described to this point comprises adjustable elements of the passive type, meaning they do not dissipate energy or dissipate very little energy to change the electromagnetic impedance. This passive change alters the reflection and/or transmission of the primary wave in the medium. The adjustable elements are then elements independent of the antenna 32 which do not emit a wave in the absence of the primary wave. They modify the manner in which the primary wave is reflected and/or transmitted in the medium.

The method is optionally implemented by a system 1 slightly different from the system 1 described above.

For example, the waveform shaping device 10 is integrated into the source, the transmitter 30.

According to one variant, the adjustable elements controlled by a set of parameters may be adjustable elements such as metal diffusers as described in patent application No. WO 2008/007024. Such elements are elements which transform said one propagating wave into an evanescent wave. They are positioned close to an antenna, the antenna 32 of the transmitter 30, and modify the properties of this antenna 32. In particular, these diffusers may be at a distance less than the wavelength of the primary wave, and possibly at a distance less than the primary wavelength divided by ten. Each of the diffusers is then electrically coupled with an adjustable electronic component to form an adjustable element of the present invention. These adjustable elements are still passive elements, but they are elements that are electromagnetically coupled to active antenna elements which they influence. In this variant, these adjustable elements are therefore diffusers near the antenna and they change the manner in which the primary wave is emitted and/or received by the antenna 32.

According to one variant, the adjustable elements controlled by a set of parameters may be antenna elements of a phased array antenna (antenna 32), and the set of parameters adjusts the phase of each antenna element (adjustable element) relative to a common reference. In this case, the adjustable elements are active elements, meaning elements that radiate energy to generate a wave that propagates in the medium.

Finally, the system 1 may be a mobile device in the medium M. Optionally, the transmitter 30 is mobile in the medium M and/or the waveform shaping device 10 is mobile in the medium M. Due to this mobility, the detection and/or identification and/or location characteristic of the receiver is better determined.

The inventors have observed that this measurement of the secondary wave is a signal making it possible to detect and/or identify and/or locate the receiver 20 faster and more precisely than in the systems of the prior art not comprising a waveform shaping device 10, and does so by virtue of a particular method described below.

According to the method of the invention, the system 1:

a) causes the antenna 32 of the transmitter 30 to emit a primary wave, b) controls the adjustable elements of the waveform shaping device 10 during at least one probing period P, successively with a plurality of sets of parameters, each set of parameters being different from the previous one, in order to modify the propagation of the primary wave and/or secondary wave during the emission and/or reception of waves by the antenna 32, c) stores signals received by the antenna during said probing period P, and d) determines the characteristic of the receiver in the medium based on the signals received for each set of parameters.

For example, during a probing period P, which is a a period of time, the system changes N times the set of parameters controlling the adjustable elements, in order to modify the impedance of the tunable surface 11 N times. N is a positive natural number greater than two. It is preferably greater than 10, so that many sets of parameters are applied. Optionally, this number N is greater than 20 in order to increase the number of sets of parameters and the number of experiments in the medium M and thus increase the accuracy of the determination of the characteristic.

In fact, this method performs a plurality of experiments of the medium by successively changing the set of parameters controlling the adjustable elements of the tunable surface 11, several times. Therefore, this method varies the impedance of the tunable surface 11 several times.

This method thus varies the propagation of the waves in the medium, and in particular this method varies the indirect multiple paths, while the most direct paths are retained. In particular, for all the experiments, the direct path between the antenna 32 and the receiver 20 is retained so that its contribution in the estimation of the characteristic of the receiver 20 is preponderant.

In each experiment (i.e. for each set of parameters, i.e. each impedance of the tunable surface 11), the return signals from the receiver 20 are saved by the system 1, which allows processing to eliminate the less direct paths, i.e. to determine the predominant propagation paths common to all the experiments, and primarily the direct path between the antenna 32 and the receiver 20.

The system processes the signals in order to apply processing corresponding to the desired characteristic (detection, identification, or location), for example using processing as applied in methods of the prior art but based on the signals received by the system for the plurality of sets of parameters.

According to one variant, the determination of the characteristic in step d) comprises a correlation calculation for the received signals, for example to extract components common to these received signals and determine the characteristic of the receiver 20.

According to one variant, the determination of the characteristic in step d) comprises a statistical calculation for the received signals, for example to extract pre-information common to these received signals and determine the characteristic of the receiver 20.

For example, the detection characteristic may be based on detection of a received signal greater than a predetermined threshold. Thus, the receiver 20 is detected if the received signal exceeds this predetermined threshold, and is not detected otherwise.

For example, the detection and/or identification and/or location characteristic may be based on a comparison of each signal received by the antenna 32 (as returned after emission of the primary wave) to a particular signature, i.e. a previously saved expected return signal for a known receiver 20. Comparison is understood to mean any process of coherence between two signals and/or between a received signal and a signature signal (or a reference signal). For example, the comparison results in detection of a receiver 20 if the coherence between the signals is greater than a predetermined threshold, and in non-detection otherwise.

For example, the detection and/or identification and/or location characteristic of the receiver may be based on a comparison of each signal received by the antenna 32 (as returned after emission of the primary wave) to a saved database of predetermined signals, said database comprising for each predetermined signal a predetermined detection and/or identification and/or location characteristic of the receiver 20. Thus, the predetermined signal of the database is determined as closest to the received signal by making all the comparisons and determining the most comparison of highest likelihood. This process is similar to a correlation calculation. And, the determined receiver characteristic is the predetermined characteristic assigned to the predetermined signal of highest likelihood.

This database of predetermined signals is advantageously filled based on several sets of parameters. Then, the characteristic of the receiver is determined from the likelihood results of all the sets of parameters, as explained in step d) of the method. The determined receiver characteristic is thus the predetermined characteristic assigned to the predetermined signal of greatest likelihood among some or all parameter set possibilities.

These arrangements then allow taking into account and/or being robust against variations or drifts of the medium over time, and for example changes caused by the tunable surface 11.

Optionally, the system 1 further comprises reference receivers of predetermined characteristic which are placed in the medium M. In other words, the medium comprises a distribution of known reference receivers, i.e. for which the detection/identification/location characteristic of this reference receiver is saved in the database in association with each of the predetermined signals corresponding to said reference receivers. This predetermined characteristic comprises an identifier and/or a position in the medium (predetermined for the system, for example during a step of system calibration or learning).

The controller 12 then compares the signals received for the plurality of sets of parameters to the database of predetermined signals of these reference receivers (e.g. signals received by these reference receivers during the calibration step). This database also comprises the predetermined characteristic of each reference receiver in association with the predetermined signal for that reference receiver.

By means of these reference receivers, the database can be updated periodically: the predetermined signals of the reference receivers are measured periodically with a plurality of sets of parameters. For example, only the received signals that are the most coherent with the previous received and validated signals (predetermined signals) or only the received signals that are the most coherent with each other are kept in the database as new predetermined signals.

Due to this arrangement of the reference receivers, it is possible to follow variations or drifts of the medium over time, and in particular variations or drifts of the received reference signals. In contrast, the identifiers and positions of the reference receivers remain unchanged from the predetermination during the calibration phase. If some reference receivers are moved, added, or deleted, the database must then be updated by another process, such as during the calibration phase.

Optionally, the database comprises predetermined signals unrelated to a reference receiver and predetermined signals corresponding to reference receivers; these latter may be updated regularly. The method then uses some or all of said database to determine the characteristic of the receiver. In particular, it is possible to select only part of the database to determine the characteristic of the receiver, in particular for example on the basis of the value of the sets of parameters close to a target value of the parameters or close to a target value of the characteristic (such as a spatial position in the medium for the location).

In addition, the controller 12 may comprise control logic for the antenna 32 such that the primary wave is focused around one or more reference receivers, which makes it possible to search for a receiver 20 (unknown receiver) around said reference receivers on which the system focuses the primary wave. The antenna 32 is thus, for example, an antenna composed of several independent antenna elements of the phased array type allowing focusing for example by beamforming. Then, the method/system focuses the primary wave around a reference receiver before performing steps a) through d) to detect/identify/locate a receiver in that region around the reference receiver.

Optionally, the logic of the controller 12 for controlling the antenna 32 drives the antenna elements as above, but also drives some adjustable elements or all adjustable elements so that the primary wave is focused around one or more reference receivers, which makes it possible to perform an even more efficient search for a receiver 20 (unknown receiver) around said reference receivers on which the system (antenna and adjustable elements) is focusing the primary wave. As above, the antenna 32 is thus for example a phased array antenna with multi-elements for performing beamforming. Then, the method/system focuses the primary wave around a reference receiver before performing steps a) to d) to detect/identify/locate a receiver in the medium M within a region around the reference receiver.

The characteristic of the determined receiver may then be a function of the predetermined characteristic(s) of the reference receiver(s) focused around. In particular, depending on the signal received from the receiver 20, the characteristic of the receiver may or may not be a linear combination of the reference characteristics of said reference receivers.

It is then possible to focus around the reference receivers one after the other, or only a sub-list of these reference receivers.

For example, the identification characteristic is included in each of the signals received by the antenna 32 (as returned after emission of the primary wave). In other words, the receiver 20 comprises a memory in which an identification data item is stored, and it transmits this identification data item with the secondary wave 44 emitted. The system 1 then decodes this identification data item for each received signal. Optionally, the receiver 20 thus has an RFID badge which responds to a primary wave 40 by emitting a secondary wave 44 with its identification data item.

The processing of the plurality of identifications received (for example by comparison) allows determining the most probable identification and/or a plurality of receivers each with a different identification data item.

For example, the location characteristic is determined by estimating an angle of arrival and/or a time of flight of the secondary wave resulting from the presence of the receiver 20 in the medium M. Optionally, the antenna 32 comprises a plurality of antenna elements and the set of signals received by each antenna element make it possible to improve the estimate of the location characteristic of the receiver 20.

For example, the detection and/or identification and/or location characteristic is determined using a data item included in the returning secondary wave 44. In certain applications for communicating with wireless radio receivers 20, for example by GSM, WiFi, or Bluetooth, the receiver 20 introduces into its emission information concerning the reception of the primary wave that it receives, and for example the level and/or quality and/or estimate of the propagation channel C1 transfer function between the antenna 32 and the receiver 20. The system 1 is then adapted to decode the received signals and to extract this information from the signals. This information then allows estimating for example the distance between the antenna 32 and the receiver 20, and therefore allows determining the location of the receiver 20 in the medium M.

Thus, the controller 12 can use at least one data item included by the receiver 20 in each of the signals received by it, this data item possibly corresponding to the level (amplitude or intensity) of the reception of the primary wave by the receiver 20 and/or the quality of the reception of the primary wave by the receiver 20 and/or the estimation of the propagation channel transfer function between the antenna 32 and the receiver 20.

According to a first variant, the system 1 (for example the controller 12 or the communication unit 31) calculates an average of the signals received by the antenna 32 in order to determine an average signal and determine the characteristic of the receiver 20 from this average signal. The system thus directly calculates an average of the signals received by the antenna 32 to determine the characteristic of the receiver 20.

Alternatively, the system 1 calculates an average of values calculated from the signals received by the antenna 32 in order to determine the characteristic of the receiver 20. The system thus indirectly calculates an average of the signals received by the antenna 32 to determine the characteristic of the receiver 20.

According to a second variant, the duration of the probing period P is short, and for example less than or equal to a duration of the primary wave 40 and/or of the secondary wave 44 returned. This means that the set of parameters is changed at least several times during propagation of the primary wave and/or secondary wave. Thus, the signals received by the antenna 32 and stored take into account this plurality of sets of parameters, i.e. the plurality of impedances.

This second variant implements an equivalent of the first variant in an analogous manner, without using any computational resource of the system. The system 1 then directly processes the signals received by the antenna 32 to determine the characteristic of the receiver 20.

The rate C of modification of the impedance of the tunable surface 11 is the number N of sets of parameters divided by the duration of the probing period P, i.e. C=N/P. For example, this rate C is greater than a threshold rate, which is for example 100 per second to have a very rapid change in impedance, or 10 per second to have a simply rapid change.

According to one variant, the plurality of sets of parameters is a random sequence, meaning that:
the values of a set of parameters are random values with respect to each other, i.e. the states of the adjustable elements are random with respect to each other, and
a value of a set of parameters corresponding to an adjustable element is random with respect to the value of the previous set of parameters or of any other set of parameters corresponding to this same adjustable element.

According to one variant, the plurality of sets of parameters is a previously saved sequence, meaning that the plurality of sets of parameters is a set of values which are replayed once the sequence has been fully played.

In this manner, the system 1 varies the impedance of the tunable surface 11 in a random or quasi-random manner over time, which makes it possible to vary the propagation paths of the primary and secondary waves in the medium.

According to one variant, the plurality of sets of parameters is a sequence in which the state of a small number of the adjustable elements is modified in each step, meaning that a set of parameters only differs from the previous one by a few values corresponding to these adjustable elements of the tunable surface 11. The low number is for example less than 10% of the total number of adjustable elements of the system 1. Optionally, this low number is reduced to just one: only one adjustable element is modified by only one value of the set of parameters.

With this type of sets of parameters, the processing of the received signals can be simplified.

In particular, in the case of processing to locate the receiver 20, and if the spatial position of each adjustable element of the surface 20 is known, the amplitudes and/or the times of flight of the received signals make it possible for example to estimate distances between the receiver 20 and each of the adjustable elements. These distances allow deducing the spatial position of the receiver 20 in the medium M, meaning its location in the medium M.

According to one variant, the system 1 extracts a single frequency component from each received signal, and due to the plurality of received signals, i.e. for example a signal for each set of parameters or impedance of the tunable surface 11, the system 1 is then capable of determining the characteristic of the receiver 20 (detection and/or identification and/or location) according to one of the processing examples explained above.

We will now detail some variants of the method/system, in which the receiver 20 inserts, into the transmitted primary wave 43, a data item corresponding to its reception of the primary wave.

According to a first variant, the data item corresponds to the level of the wave received by the receiver 20, meaning its intensity.

During the probing period, the controller 12 uses two sets of parameters: a first set of parameters and a second set of parameters, the second set of parameters corresponding to a phase adjustment of the adjustable elements shifted by $\pi$ radians relative to that of the first set of parameters. This means that the reflected and/or transmitted wave of an adjustable element has its phase which changes by $\pi$ radians between the first set and the second set of parameters.

Next, the controller 12 decodes, in the received signals, a first data item $I_1$ corresponding to the first set of parameters and a second data item $I_2$ corresponding to the second set of parameters, the first and second data items thus corresponding to the level of the wave received by the receiver in response to each set of parameters (the first and the second); in other words, the first data item $I_1$ corresponds to the level with a first phase, and the second data item $I_2$ corresponds to the level with a phase shift of $\pi$ radians relative to the first phase.

The characteristic of the receiver 20 is then determined by the controller 12 based on a first calculated value $\psi_1$ which is the difference between the second data item $I_2$ and the first data item $I_1$, in other words:

$$\psi_1 = (I(\pi) - I(0)) = (I_2 - I_1).$$

The determined characteristic of the receiver may be a detection and/or identification and/or location in the medium.

The characteristic of the receiver is then for example determined on the basis of several first calculated amounts $\psi_1$ calculated from decoded data for a plurality of sets of parameters, these sets of parameters comprising several pairs of a first set of parameters and a second set of parameters, each pair making it possible to calculate a first calculated value $\psi_1$ as explained with the preceding formula.

For example, the characteristic of the receiver may be determined by an average or a dot product or a combination or a function of the first calculated amounts $\psi_1$ calculated from each pair of sets of parameters containing a first set of parameters and a second set parameters.

According to a second variant, the data item also corresponds to the level of the wave received by the receiver 20, meaning its intensity.

During the probing period, the controller 12 uses four sets of parameters: a first set of parameters, a second set of parameters, a third set of parameters, and a fourth set of parameters.

The second set of parameters corresponds to a phase adjustment of the adjustable elements shifted by $\pi/2$ radians relative to the first set of parameters, the third set of parameters corresponds to a phase adjustment of the adjustable elements shifted by $\pi$ radians relative to the first set of parameters, and the fourth set of parameters corresponds to a phase adjustment of the adjustable elements shifted by $3 \cdot \pi/2$ radians relative to the first set of parameters. This means that the wave reflected and/or transmitted from an adjustable element has its phase which changes by the corresponding angle.

Next, the controller 12 decodes, in the received signals, a first data item $I_1$ corresponding to the first set of parameters, a second data item $I_2$ corresponding to the second set of parameters, a third data item $I_3$ corresponding to the third set of parameters, and a fourth data item $I_4$ corresponding to the fourth set of parameters. The first, second, third, and fourth data items each correspond to the level of the wave received by the receiver for the corresponding set of parameters.

The characteristic of the receiver is then determined by the controller 12 from a second calculated value $\psi_2$ calculated by the following formula:

$$\psi_2 = (I(\pi) - I(0)) + i(I(3\pi/2) - I(\pi/2)) = (I_3 - I_1) + i(I_4 - I_2)$$

i being the imaginary unit.

The determined characteristic may be a detection and/or an identification and/or a location in the medium.

The characteristic of the receiver is then for example determined on the basis of several second calculated amounts $\psi_2$ calculated from decoded data for a plurality of sets of parameters, these sets of parameters comprising groups of four sets of parameters as defined above.

For example, the characteristic of the receiver may be determined by an average or a dot product or a combination or a function of the second calculated amounts $\psi_2$ calculated from each group of four sets of parameters. Generalization to a larger number of sets of parameters is possible.

According to a third variant, the data item corresponds to the estimate of the propagation channel transfer function between the antenna 32 and the receiver 20, which makes it possible in particular to obtain the amplitude and the phase of this transfer function or the real part and imaginary part of this transfer function if the estimation is carried out on this basis.

During the probing period, the controller 12 decodes, in the received signals, data corresponding to the estimate of the propagation channel transfer function (A($\omega$)) between the antenna 32 and the receiver 20. In this case, the transmitter 30 and the receiver 20 use for the primary wave 40 a multi-frequency propagation channel C1 or one with a predetermined bandwidth, so that the transfer function can be estimated at least at a plurality of angular frequencies $\omega_i$, where an angular frequency $\omega_i$ is equal to $2 \cdot \pi \cdot f_i$, and $f_i$ is one of the estimation frequencies of the transfer function.

The characteristic of the receiver is then determined by the controller 12 from a third calculated value m($\omega$), by the following formula:

$$m(\omega) = \frac{dA}{d\omega} A^*(\omega)$$

where

A($\omega$) is the transfer function as a function of the angular frequency $\omega$ between the antenna 32 and the receiver 20, d( )/M$\omega$ is the derivative operator with respect to the angular frequency, and ( )* is the complex conjugate operator.

The calculation of the third calculated value may be carried out by any other similar or equivalent formulation of the preceding formula, in particular for calculating the derivative with respect to the angular frequency.

The determined characteristic may be a detection and/or an identification and/or a location determination in the medium.

The characteristic of the receiver is then for example determined on the basis of several third calculated amounts m($\omega$) calculated from decoded data for a plurality of sets of parameters.

For example, the characteristic of the receiver may be determined by an average or a dot product or a combination or a function of the third calculated amounts m($\omega$) calculated from various sets of parameters.

In the variants and embodiments of the invention, it is possible to repeat the emissions of the primary wave in order to increase the number of received signals and improve the determination of the characteristic of the receiver 20, whether this is detection and/or identification and/or location.

Finally, the system and/or method according to the invention is particularly in the following applications.

According to a first application, the method and system is suitable for the detection and/or identification and/or location of one or more receivers 20, for example of the RFID tag or badge type, and the adjustable elements are of the passive type as explained in the present description. These adjustable elements are independent of the antenna 32 emitting the primary wave.

Advantageously, the adjustable elements of this application are placed at one or more locations suitable for the volume of the medium M, and possibly distributed within the volume of the medium.

In this first application, the method/system determines a characteristic of a receiver 20 in the medium, this characteristic being detection information and/or identity information and/or location information of said receiver 20, the method being implemented by a system 1 comprising:

an antenna 32 capable of emitting a primary wave in the medium, and of receiving a secondary wave resulting from the primary wave and from the presence of the receiver in the medium, a plurality of adjustable elements having an impedance which can be modified to change the manner in which the primary wave is reflected and/or transmitted, these adjustable elements being independent of the antenna 32, and a controller 12 connected to the antenna and to the adjustable elements and which controls the state of the adjustable elements based on a set of parameters, and the receiver 20 being capable of actively emitting the secondary wave in response to receiving the primary wave, and this receiver is an RFID type of badge or tag, and the secondary wave returned by this receiver comprises at least one identification data item of said receiver. said method being characterized in that the system:

a) causes the antenna to emit a primary wave, b) controls the adjustable elements during at least one probing period, successively with a plurality of sets of parameters, each set of parameters being different from the previous one, in order to modify the propagation of the primary wave and/or the secondary wave during the emission and/or reception of waves by the antenna, c) stores signals received by the antenna during said probing period, and d) determines the characteristic of the receiver in the medium based on the signals received for each set of parameters.

According to a second application, the method and system is suitable for communication with one or more receivers 20 of the RFID badge or tag type or of the mobile phone type connected by a wireless network (GSM, 3G, 4G, 5G) or of the mobile computer type connected to a wireless network (WiFi, Bluetooth), or of the connected object type connected to a wireless network, and in which the adjustable elements are of the passive or active type (integrated or not integrated into the antenna 32) as explained in the present description. In this case, the controller 12 advantageously decodes, in the received signals, a data item originating from the receiver 20 in order to apply specific processing to determine a characteristic of the receiver, and in particular its spatial location.

In this second application, the method/system determines a characteristic of a receiver 20 in the medium, this characteristic being location information for the receiver 20, the method being implemented by a system 1 comprising:

an antenna 32 capable of emitting a primary wave in the medium, and of receiving a secondary wave resulting from the primary wave and from the presence of the receiver in the medium, a plurality of adjustable elements having an impedance which can be modified to change the manner in which the primary wave is emitted and/or reflected and/or transmitted, and a controller 12 connected to the antenna and to the adjustable elements and which controls the state of the adjustable elements based on a set of parameters, and the receiver 20 being capable of actively emitting the secondary wave in response to receiving the primary wave, said method being characterized in that the system:

a) causes the antenna to emit a primary wave, b) controls the adjustable elements during at least one probing period, successively with a plurality of sets of parameters, each set of parameters being different from the previous one, in order to modify the propagation of the primary wave and/or secondary wave during the emission and/or reception of waves by the antenna, c) stores signals received by the antenna during said probing period, and d) determines the characteristic of the receiver in the medium based on the signals received for each set of parameters.

In all these applications, the various variants presented in the present description can be applied or adapted.

In all these applications, the plurality of sets of parameters allows the system to improve the determined characteristic of the receiver.

The invention claimed is:

1. Method for determining a characteristic of a receiver in a medium, said characteristic being detection information and/or identity information and/or location information of said receiver, said method being implemented by a system comprising:

an antenna capable of emitting a primary wave in the medium, and of receiving a secondary wave resulting from the primary wave and from the presence of the receiver in the medium, a plurality of adjustable elements having an impedance which can be modified to change the manner in which the primary wave is emitted and/or reflected and/or transmitted, and a controller connected to the antenna and to the adjustable elements and which controls the state of the adjustable elements based on a set of parameters, and the receiver being capable of actively emitting the secondary wave in response to receiving the primary wave, said method comprising:

a) causing the antenna to emit a primary wave, b) controlling the adjustable elements during at least one probing period, successively with a plurality of sets of parameters, each set of parameters being different from the previous one, in order to modify the propagation of the primary wave and/or secondary wave during the emission and/or reception of waves by the antenna, c) storing signals received by the antenna during said probing period, and d) determining the characteristic of the receiver in the medium based on the signals received for each set of parameters.

2. The method according to claim 1, wherein the controller calculates an average of the received signals or an average of values calculated from the received signals, in order to determine the characteristic of the receiver.

3. The method according to claim 1, wherein the plurality of sets of parameters is a random sequence.

4. The method according to claim 1, wherein the plurality of sets of parameters is a previously saved sequence.

5. The method according to claim 1, wherein the plurality of sets of parameters is a sequence which changes a small number of the adjustable elements at a time, said small number being less than 10% of the adjustable elements of the system, and the controller determines the characteristic based on the saved signals of higher amplitude, and on knowledge of the positions of the adjustable elements which caused this higher amplitude.

6. The method according to claim 1, wherein the controlling of the adjustable elements is carried out at a rate greater than a threshold rate.

7. The method according to claim 1, wherein the controller compares the signals received for the plurality of sets of parameters with a stored database of predetermined signals, said database including the characteristic of the receiver in association with the predetermined signals.

8. The method according to claim 7, wherein the predetermined signals comprise a single frequency.

9. The method according to claim 1, wherein the system further comprises reference receivers of a predetermined characteristic, and wherein the controller compares the signals received for the plurality of sets of parameters with a stored database of predetermined signals for those reference receivers, said database including the predetermined characteristic of each reference receiver in association with the predetermined signal for that reference receiver, and the characteristic of the receiver is determined by determining the comparison of highest likelihood between the signals received and the predetermined signals of the reference receivers.

10. The method according to claim 9, wherein the predetermined signals of the reference receivers of the database are periodically updated.

11. The method according to claim 9, wherein the controller comprises control logic for the antenna and/or adjustable elements so that the primary wave is focused around one or more reference receivers, and the primary wave is focused around said reference receiver before performing steps a) to d).

12. The method according to claim 9, wherein the signals received from the reference receivers are periodically measured with the plurality of sets of parameters, and only the most coherent received signals are kept in the database.

13. The method according to claim 1, wherein the controller uses at least one data item included by the receiver in each of the received signals, said data item corresponding to the level and/or to the quality and/or to the estimate of the propagation channel transfer function between the antenna and the receiver.

14. The method according to claim 13, wherein:
the plurality of sets of parameters for the adjustable elements comprises a first set of parameters and a second set of parameters, the second set of parameters corresponding to a phase shift of $\pi$ radians relative to the first set of parameters,
the controller decodes, in the received signals, a first data item corresponding to the first set of parameters and a second data item corresponding to the second set of parameters, the first and the second data items corresponding to the level of the wave received by the receiver, and
the characteristic of the receiver is determined from a first calculated value which is the difference between the second data item and the first data item, in other words:

$$\psi_1 = (I_2 - I_1)$$

where
$\psi_1$ is the first calculated value, and
$I_1$ and $I_2$ are respectively the first data item and the second data item.

15. The method according to claim 13, wherein:
the plurality of sets of parameters for the adjustable elements comprises a first set of parameters, a second set of parameters, a third set of parameters, and a fourth set of parameters, the second set of parameters corresponding to a phase shift of $\pi/2$ radians relative to the first set of parameters, the third set of parameters corresponding to a phase shift of $\pi$ radians relative to the first set of parameters, and the fourth set of parameters corresponding to a phase shift of $3\cdot\pi/2$ radians relative to the first set of parameters,
the controller decodes, in the received signals, a first data item corresponding to the first set of parameters, a second data item corresponding to the second set of parameters, a third data item corresponding to the third set of parameters, and a fourth data item corresponding to the fourth set of parameters, the first, second, third, and fourth data items corresponding to the level of the wave received by the receiver, and
the characteristic of the receiver is determined from a second calculated value as follows:

$$\psi_2 = (I_3 - I_1) + i(I_4 - I_2)$$

where
$\psi_2$ is the first calculated value, and
$I_1$, $I_2$, $I_3$ and $I_4$ are respectively the first data item, the second data item, the third data item, and the fourth data item, and
i is the imaginary unit.

16. The method according to claim 13, wherein:
the controller decodes, in the received signals, a data item corresponding to the estimate of the propagation channel transfer function between the antenna and the receiver, and
the characteristic of the receiver is determined from a third calculated value as follows:

$$m(\omega) = \frac{dA}{d\omega} A^*(\omega)$$

where
$m(\omega)$ is the third calculated value,
$A(\omega)$ is the transfer function as a function of the angular frequency $\omega$,
$d(\ )/d\omega$ is the derivative operator with respect to the angular frequency, and
$(\ )^*$ is the complex conjugate operator.

17. Method according to claim 14, wherein the characteristic of the receiver is determined from an average or a dot product or a combination or a function of several calculated amounts, said calculated amounts being first calculated amounts or second calculated amounts or third calculated amounts.

18. System for determining a characteristic of a receiver in a medium, said characteristic being detection information and/or identity information and/or location information of said object, said system comprising:
an antenna capable of emitting a primary wave in the medium, and of receiving a secondary wave resulting from the primary wave and from the presence of the receiver in the medium, a plurality of adjustable elements having an impedance which can be modified to change the manner in which the primary wave is emitted and/or reflected and/or transmitted, and a controller connected to the antenna and to the adjustable elements and which controls the state of the adjustable elements based on a set of parameters, and the receiver being capable of actively emitting the secondary wave in response to receiving the primary wave, said system being structured so as to be capable of:
a) causing the antenna to emit a primary wave,
b) controlling the adjustable elements during at least one probing period, successively with a plurality of sets of parameters, each set of parameters being different from the previous one, in order to modify the propagation of the primary wave and/or secondary wave during the emission and/or reception of waves by the antenna,
c) storing signals received by the antenna during said probing period, and
d) determining the characteristic of the receiver in the medium based on the signals received for each set of parameters.

19. The system according to claim 18, wherein the adjustable elements are part of a surface or a plurality of surfaces.

20. The system according to claim 18, wherein the receiver responds to the primary wave by emitting a secondary wave including a data item stored in the receiver, and the controller processes the received signals to decode said data item and determine said characteristic.

21. The system according to claim 18, wherein the receiver is an object connected to a wireless computer network, and the primary wave and secondary wave are emissions and/or receptions of the wireless network.

22. The system according to claim 21, wherein the computer network is a Bluetooth, WiFi, or GSM type of network.

23. The system according to claim 18, wherein the receiver is an RFID type badge, and the secondary wave comprises at least one data item identifying said receiver.

24. The system according to one claim 18, wherein the adjustable elements are elements independent of the antenna and which change the manner in which the primary wave is reflected and/or transmitted.

25. The system according to claim 18, wherein the adjustable elements are diffusers near the antenna and which change the manner in which the primary wave is emitted and/or received by said antenna.

26. The system according to claim 18, wherein the adjustable elements are antenna elements of the antenna and which are controlled with an adjustable phase.

27. The system according to claim 18, wherein the adjustable elements are on a mobile device in the medium.

* * * * *